(12) United States Patent
Russum et al.

(10) Patent No.: US 7,019,895 B2
(45) Date of Patent: Mar. 28, 2006

(54) MICROSCOPE STAGE PROVIDING IMPROVED OPTICAL PERFORMANCE

(75) Inventors: William C. Russum, Tucson, AZ (US); Artur G. Olszak, Tucson, AZ (US)

(73) Assignee: DMetrix, Inc., Tucson, AZ (US)

( * ) Notice: Subject to any disclaimer, the term of this patent is extended or adjusted under 35 U.S.C. 154(b) by 0 days.

(21) Appl. No.: 10/295,511

(22) Filed: Nov. 15, 2002

(65) Prior Publication Data
US 2004/0095641 A1    May 20, 2004

(51) Int. Cl.
*G02B 21/34* (2006.01)

(52) U.S. Cl. ...................................... 359/396; 359/391
(58) Field of Classification Search ................ 359/368, 359/391–398
See application file for complete search history.

(56) References Cited

U.S. PATENT DOCUMENTS 5,672,816 A * 9/1997 Park et al. .................... 73/105
6,437,912 B1 * 8/2002 Shiba et al. ................. 359/383

OTHER PUBLICATIONS

Veeco Instruments, Dimension VX 330 Atomic Force Profiler, www.veeco.com.
Veeco Instrumetns, Dimension VX 210 Atomic Force Profiler, www.veeco.com.

* cited by examiner

*Primary Examiner*—Drew A. Dunn
*Assistant Examiner*—Joshua L Pritchett
(74) *Attorney, Agent, or Firm*—Birdwell & Janke, LLP (57) ABSTRACT

A microscope stage providing improved optical performance. A carriage for supporting an object has a transparent portion for receiving the object and permitting trans-illumination thereof. A base supports the carriage, at least a portion of the base comprising a transparent material to permit illumination of the specimen there through. Bearings disposed between the base and the carriage support the carriage on the base and permit relative movement thereof. The base has a dovetail cross sectional shape with bearings between the top of the carriage and the base and between the sidewalls of the carriage and the base. A cover is coupled to the carriage so as to transfer force thereto without imparting a significant movement thereto. A mechanism connected to the cover for moving the carriage relative to the base is disposed at a position offset from the axis of lateral symmetry of the carriage and base.

50 Claims, 6 Drawing Sheets

MICROSCOPE STAGE PROVIDING IMPROVED OPTICAL PERFORMANCE

FIELD OF THE INVENTION

This invention relates to microscope stages, particularly to stages for scanning microscopes.

BACKGROUND OF THE INVENTION

To produce a high-resolution image, a microscope requires a numerical aperture in excess of about 0.6. To form a sharp image of an object over its full lateral extent, the features of the object that are of interest must be within the depth of focus of the microscope. To try to maintain the full lateral extent of an important feature of an object within the depth of focus of a microscope, high-grade mechanical stages are typically used to achieve sufficient flatness and repeatability of travel. In a scanning microscope the problem of maintaining the feature within the depth of focus can be remedied in part by detection of the best focal plane for the feature and adjusting the position of the optical system along its optical axis relative to the stage to compensate for any changes in flatness as the feature is moved laterally with respect to the optical system. This solution can only be successfully implemented to the extent the stage can repeatably position the object along the optical axis. In any case, a numerical aperture of 0.6 or more can reduce the depth of focus to the sub-micrometer level, which challenges the capability of known mechanical stages.

Another problem encountered with high numerical aperture microscopes is that, since the numerical aperture of the illumination system should match the numerical aperture of the observation optics to maximize the optical resolution of the image, a high numerical aperture requires a relatively large space for the mechanical components of the stage. This is because of the need to accommodate the components of a high numerical aperture illumination system.

These problems become particularly acute in a recent innovation in microscopy known as a miniature microscope array ("MMA") or, when applied to a common object, as an "array microscope". In miniaturized microscope arrays, a plurality of imaging lens systems are provided having respective optical axes that are spaced apart from one another. Each imaging lens system images a respective portion of the object.

In an array microscope, a linear array of imaging elements is preferably provided for imaging across a first dimension of the object, and the object is translated past the fields of view of the individual imaging elements in the array, so that the array is caused to scan the object across a second dimension to image the entire object. The relatively large individual imaging elements of the imaging array are staggered in the direction of scanning so that their relatively small fields of view are contiguous over the first dimension. The provision of the linear detector arrays eliminates the requirement for mechanical scanning along the first dimension, providing a highly advantageous increase in imaging speed.

The MMA concept invites the corresponding concept of providing each imaging element with a corresponding trans-illumination element. For optimal effect, the numerical aperture of the illumination lens systems needs to be matched to the numerical aperture of their corresponding imaging elements. That is, if the illumination system transmits light to the object at angles greater than the acceptance angle of the imaging system, some of the light may be wasted, which reduces system efficiency. On the other hand, if the illumination system transmits light over a narrower angular range, that is, one that does not extend to the acceptance angle, the imaging system cannot take full advantage of its resolving power.

In a high numerical aperture array microscope it is desirable to pack the imaging elements of the array close together so as to acquire image data for contiguous parts of the object in the minimum scan time. However, a trans-illumination system places a limit on how close the corresponding illumination lens system can be packed and still provide the desired matching of numerical apertures. This is because the object must be supported by a slide or other transparent member that must be sufficiently thick to provide mechanical stability. Where the illumination system must project light through a glass substrate 1 to 1.5 mm thick, the working distance cannot be greater than that amount. To have a sufficiently long illumination system working distance, while maintaining the same numerical aperture as the imaging system, the diameter of the lens of the illumination system must be larger than the diameter of the lens of the imaging element. This means that providing each imaging element with its own illumination element requires either that sub optimal imaging element packing or sub optimal numerical aperture matching must be employed. However, in a related patent application Ser. No. 10/191,874, entitled SINGLE AXIS ILLUMINATION FOR MULTI-AXIS IMAGING SYSTEM, it has been disclosed that in a multi-axis imaging system such as an array microscope, a single axis trans-illumination system permits maximum packing of the imaging elements and optimum matching of the numerical aperture of the illumination system with the numerical aperture of the imaging elements, while providing a practical working distance for the illumination system. Thus, a single axis optical system may be provided for illumination, preferably having the same numerical aperture as the individual imaging elements and an exit pupil large enough to fill the collective contiguous fields of view of the imaging array.

Since an object of using an MMA ordinarily is to achieve a high-resolution image, the afore-mentioned problem of maintaining focus with a scanning, high numerical aperture microscope array is typically encountered. Also, due to the wide lateral dimensions of the array, a relatively large stage is required to accommodate the illumination system whether it is a single axis or multi-axis illumination system.

Accordingly, there is a need for a microscope stage that maintain high flatness and repeatability during lateral movement for scanning, and that provides room for relatively large trans-illumination optics.

SUMMARY OF THE INVENTION

The present invention fulfills the need identified above by providing a microscope stage comprising a carriage for supporting an object to be viewed by a microscope, the carriage having a transparent portion for receiving the specimen and permitting trans-illumination thereof, a base for supporting the carriage, at least a portion of the base comprising a transparent material to permit illumination of the specimen there through, and bearings disposed between the base and the carriage for supporting the carriage on the base and permitting relative movement thereof. Preferably, the transparent portion of the base comprises glass and the transparent portion of the carriage comprises an aperture through the carriage. Also preferably, the base has a dovetail cross sectional shape, the bearings including one or more bearings between the top of the carriage and the base, and one or more bearings between the sidewalls of the carriage and the base. In a preferred embodiment, a movable cover is disposed over the base, the cover having an aperture for receiving the carriage. The cover is slidably supported on one side by a rail and supported on the other side by a lead screw drive mechanism, both of which are mounted on a support member that also supports the glass base. The carriage, base and cover define an axis of lateral symmetry in the direction of movement of the carriage, and the drive mechanism which moves the cover relative to the base, is disposed at a position offset from the axis of lateral symmetry. The cover is coupled to the carriage so that movement of the cover along the axis of lateral symmetry will also move the carriage, but will not impart a significant movement to the carriage.

Therefore, it is a principle object of the present invention to provide a novel and improved microscope stage.

It is another object of the present invention to provide a microscope stage that has improved flatness and straightness of travel characteristics.

It is a further object of the present invention to provide a microscope stage that permits trans-illumination of an object as well as mechanical stability.

The foregoing and other objects, features and advantages of the invention will be more readily understood upon consideration of the following detailed description of the invention, taken together with the accompanying drawings.

DETAILED DESCRIPTION OF THE INVENTION

The present invention comprises a microscope stage, including a microscope stage together with a microscope array, and particularly an array microscope. While the microscope stage is especially advantageous when combined with an array microscope, it may also be used advantageously with other types of microscopes and the invention is not limited by the specific configurations or embodiments disclosed herein.

1. Microscope Arrays

Figure 1:
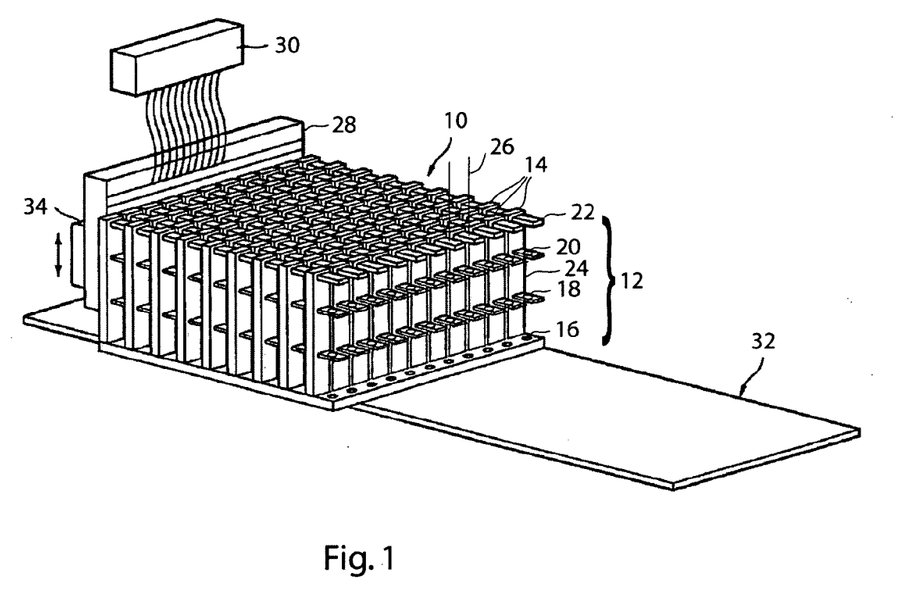
FIG. 1 is an illustration of a first exemplary embodiment of a scanning microscope array.

A first exemplary microscope array 10 is shown in FIG. 1. The microscope array 10 comprises an imaging lens system 12 having a plurality of individual imaging elements 14. Each imaging element 14 may comprise a number of optical elements, such as the elements 16, 18, 20 and 22. In this example, the elements 16, 18 and 20 are lenses and the element 22 is a detector, such as a CCD array. More or fewer optical elements may be employed. The optical elements are typically mounted on a vertical support 24 so that each imaging element 14 defines an optical imaging axis 26 for that imaging element.

The microscope array 10 is typically provided with a detector interface 28 for connecting the microscope to a data processor or computer 30 which stores the image data produced by the detectors 22 of the imaging elements 14. An object is placed on a carriage or stage 22 which may be moved beneath the microscope array so that the object is scanned by the array. The array would typically be equipped with an actuator 34 for moving the imaging elements axially to achieve focus. The microscope array 10 would also include an illumination lens system, as explained hereafter.

Figure 2:
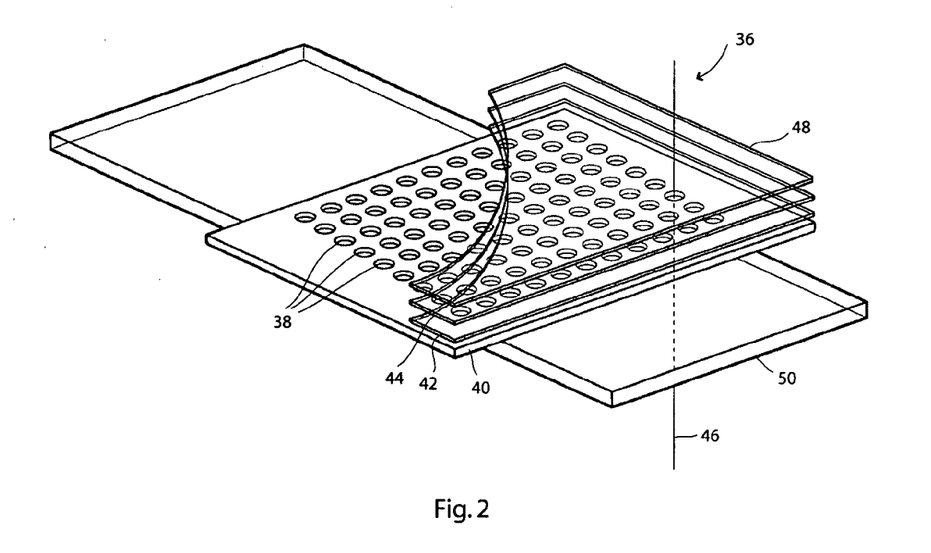
FIG. 2 is an illustration of a second exemplary embodiment of a scanning microscope array.

A second exemplary embodiment of a microscope array 36 is shown in FIG. 2. In the imaging lens system, a plurality of lenses 38 corresponding to individual imaging elements are disposed on respective lens plates 40, 42 and 44, which are stacked along respective optical axes 46 of the imaging elements. Detectors 48 are disposed above the lens plate 44. As in the case of the microscope array 10, the microscope array 36 may be employed to scan an object on a stage 50 as the stage is moved with respect to the array or vice versa.

Microscope arrays wherein the imaging elements are arranged to image respective contiguous portions of a common object in one dimension while scanning the object line-by-line in the other dimension are also known as an array microscope. Array microscopes may be used, for example, to scan and image entire tissue or fluid samples for use by pathologists. Individual imaging elements of array microscopes are closely packed and have a high numerical aperture, which enables the capture of high-resolution microscopic images of the entire specimen in a short period of time by scanning the specimen with the array microscope.

The detectors of array microscopes preferably are linear arrays of detector elements distributed in a direction perpendicular to the scan direction. As the imaging elements produce respective images that are magnified, each successive row of elements is offset in the direction perpendicular to the scan direction. This permits each imaging element to have a field of view that is contiguous with the fields of view of other appropriately positioned optical systems such that collectively they cover the entire width of the scanned object. The present invention is particularly suited for array microscopes; however, the present invention may be employed in other types of microscope arrays and multi-axis of imaging systems having a plurality of elements for imaging respective locations in space 2.

2. Microscope Stage

Figure 3:
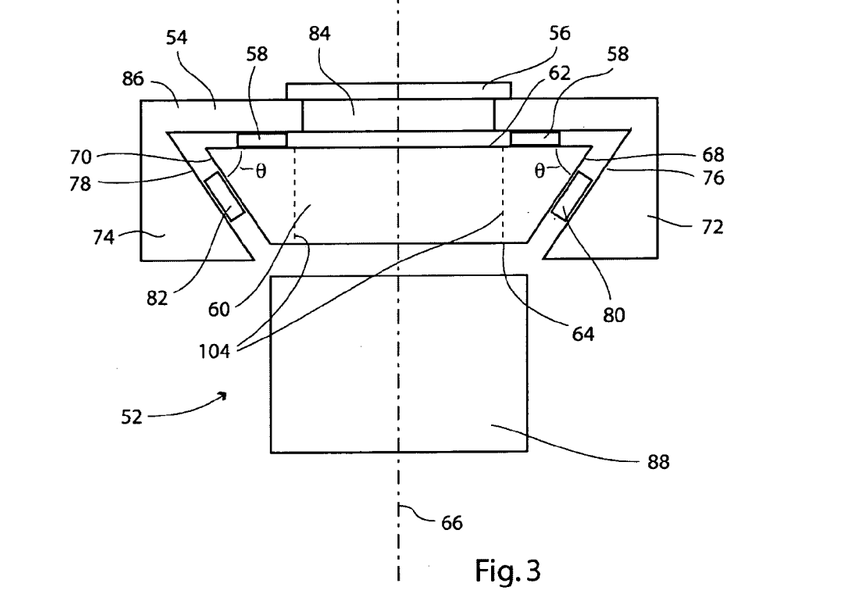
FIG. 3 is a schematic diagram of an end view of a first microscope stage configuration according to the present invention.

The schematic illustration of a first configuration 52 of a microscope stage according to the present invention is shown in FIG. 3. This stage comprises a movable carriage 54 for supporting a microscope slide 56 and is supported by low friction bearings 58 on a base 60. Preferably, the base has a dovetail shape; that is, its cross section is a quadrangle having two parallel sides 62 and 64, side 62 being wider than side 64, and having reflection symmetry about an axis 66, thereby forming two conjugate sloped sides 68 and 70. The carriage 54 includes downwardly extending sidewalls 72 and 74 whose interior surfaces 76 and 78 are substantially parallel to the respective sloped sides 68 and 70 of the base 60, and are separated there from by bearings 80 and 82, respectively. It should be understood that while a dovetail is the preferred shape for the base, other shapes, such as a rectangle, may be used without departing from the principles of the invention.

A window 84 is provided in a top portion 86 of the carriage 54 to permit trans-illumination of an object to be viewed by a microscope. Preferably, the window is an aperture through the top portion 86 of the carriage; however, it may also be a solid window of material, or a liquid cell, transparent over the wavelength band of interest. The base 60 comprises a transparent material, preferably glass, also to permit trans-illumination of the object. An appropriate illumination system 88, as is understood in the art, is provided for propagating illumination light through the base 60 and the window 84 to the object. Axis 66, which is the axis of symmetry of the base 60, preferably serves also as the optical axis for the illumination and observation optical systems.

The transparent base 60 simultaneously provides mechanical support for the stage 54 and optical transparency over the wavelength band of interest for trans-illumination. Moreover, the dovetail shape provides a particularly stable mechanical configuration and the transparent material enables the carriage to move with high flatness and repeatability. One or the other of the bearings 82 and 80 may be preloaded to ensure constant contact with the surfaces of the base 60 and carriage 54, thereby providing straightness of travel. The dovetail shape resists both lateral and vertical movement of the carriage with respect to the base. The base is preferably made of glass so that the surfaces adjacent to bearings 58, 80 and 82 may be polished to high flatness. The bearings are preferably made of Teflon® or another suitable material which provides a low friction contact. Alternatively, air bearings of a type commonly understood in the art could be employed.

Glass can be machined to very tight tolerances, for example, one quarter of the wavelength of visible light at 630 nanometers, that is, a tolerance of 150 nanometers. Using a BK7 glass dovetail with an included angle, 2θ, of 30°, it has been found that the flatness of travel of 0.03 microns and a straightness of travel of 0.2 microns can be achieved. It should be understood that while glass is the preferred medium for the base 60, other materials having similar properties may be used without departing from principles of the invention.

Figure 4:
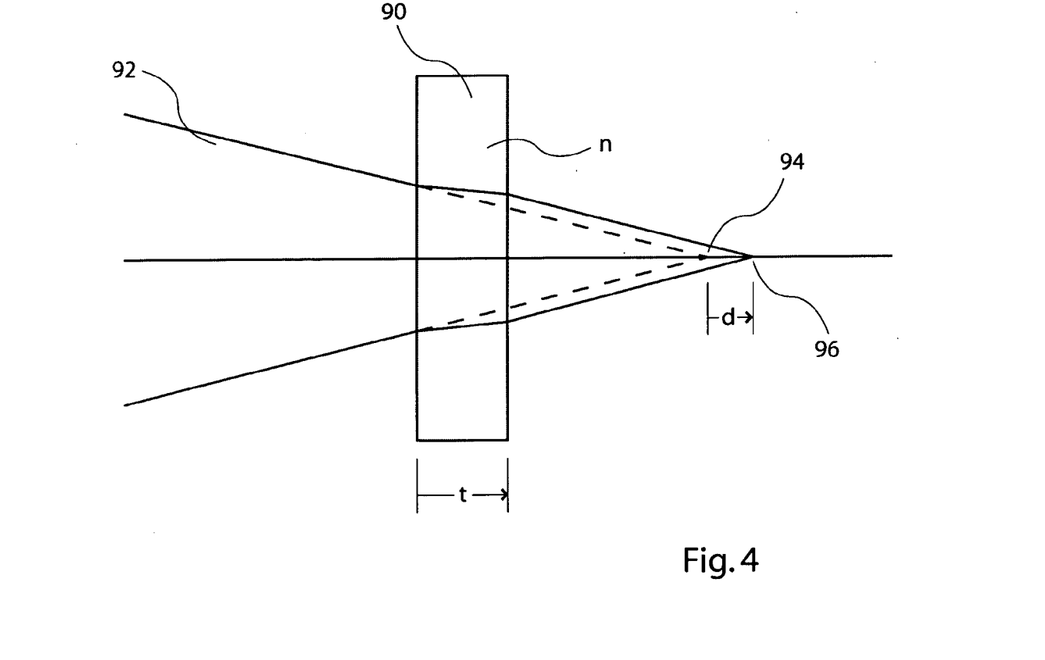
FIG. 4 is a schematic diagram of the effect of placing a glass base between an illumination source and an object to be viewed by a microscope according to the present invention.

Turning now to FIG. 4, in addition to providing for trans-illumination and polished bearing surfaces, the transparent base 60 provides the additional advantage of increasing the space available for the illumination system. When a plate 90 of refractive material having a refractive index n is placed in a focused beam 92 propagating through air, the optical path length of the beam is increased so that the original focal point 94 moves a distance d to new focal point 96. The distance d is found as follows:

$$d = t - t/n$$

where t is the thickness of the refractive plate. Consequently, the base 60 actually extends the working distance of the illumination system 88 which provides more space for the stage and illumination system.

Figure 5:
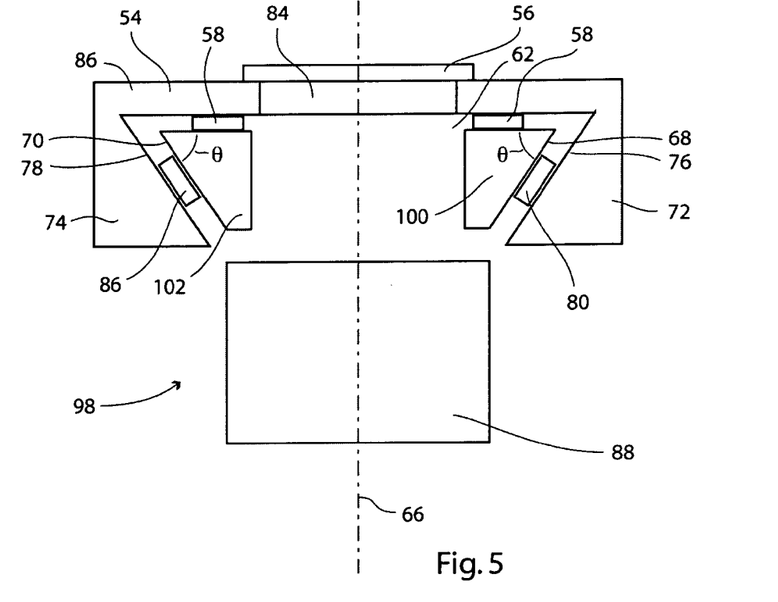
FIG. 5 is a schematic diagram of an end view of a second microscope stage configuration according to the present invention.

A second configuration 98 of a microscope stage according to the present invention is shown in FIG. 5. The difference between configuration 98 and configuration 52 is in the structure of the base. In the case of the second configuration 98, the base comprises two rails 100 and 102 which can be understood as what is left over from base 60 when a rectangular prism is removed from the center of base 60, as shown by dotted lines 104 in FIG. 3. In this case, the transparency of the base is achieved by leaving the space between the two rails 100 and 102 empty. While this does not provide an increase in the working distance of the illumination system, it does provide the mechanical advantages of the dovetail base design, including the flatness and straightness of movement of the carriage. Preferably the rails 100 and 102 are made of glass with polished surfaces adjoining the bearings, though other materials with similar properties may be used, even if they do not have the property of transparency over the required wavelength range of the illumination light.

Figure 6:
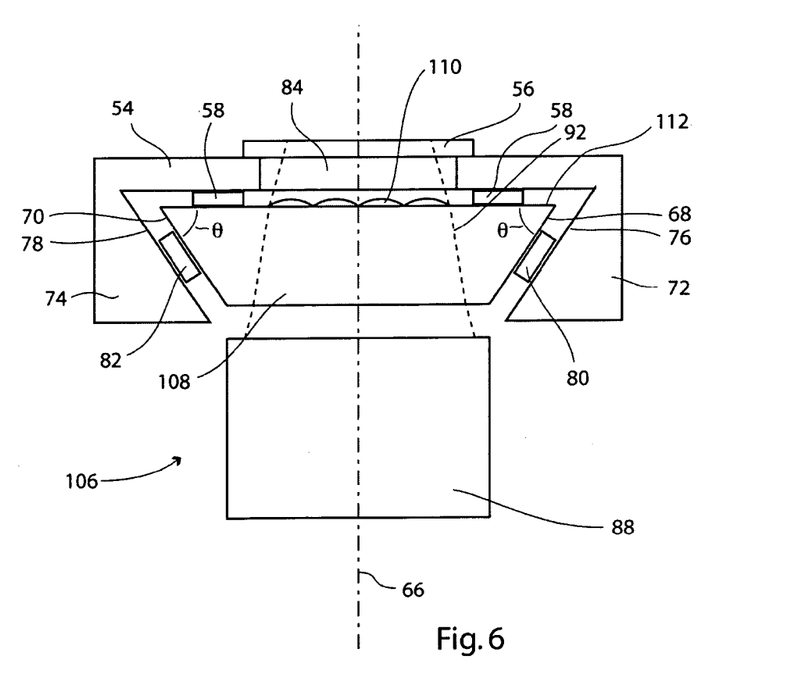
FIG. 6 is a schematic diagram of an end view of a third microscope stage configuration according to the present invention.
Figure 7A:
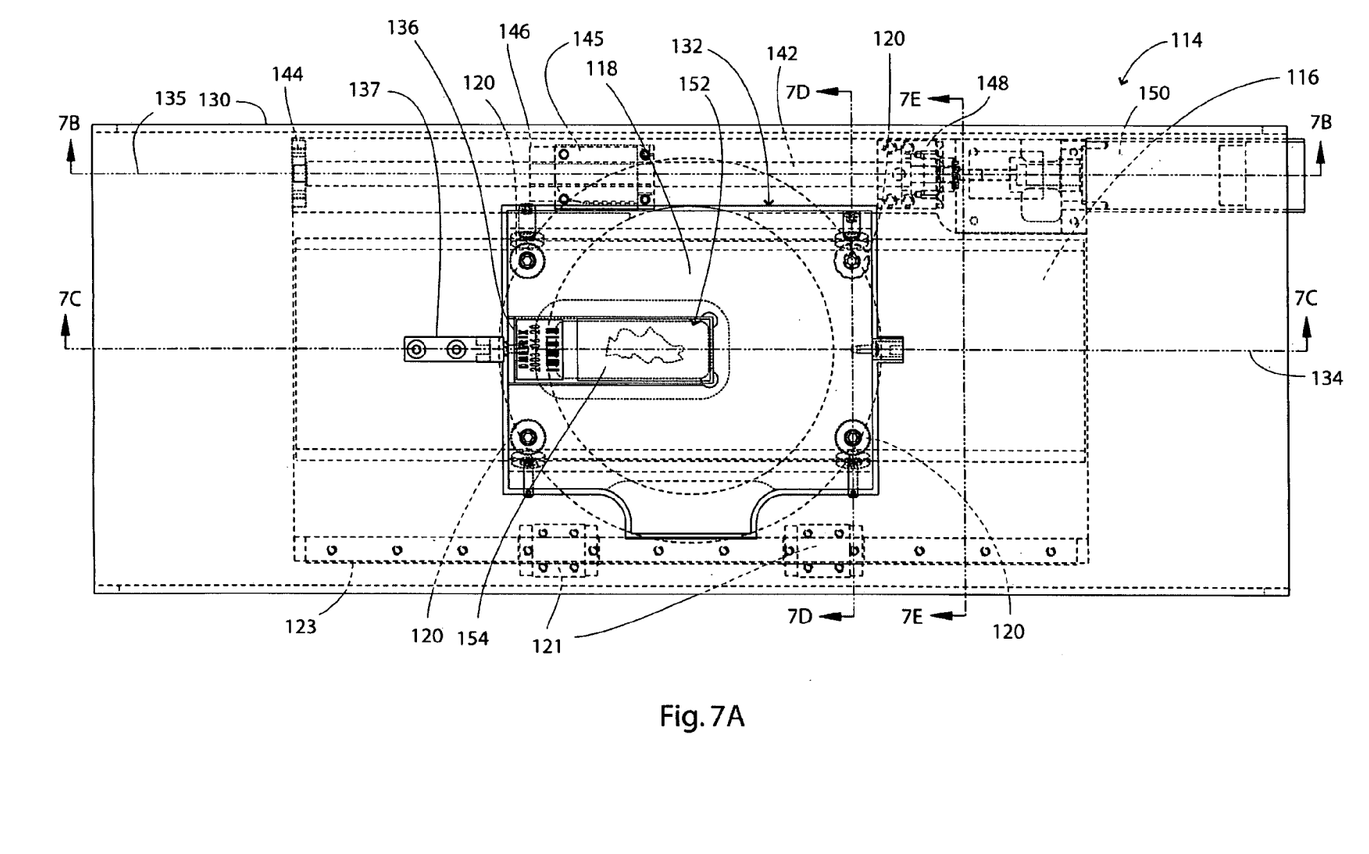
FIG. 7A is a top view of a preferred embodiment of a microscope stage according to the present invention.
Figure 7B:
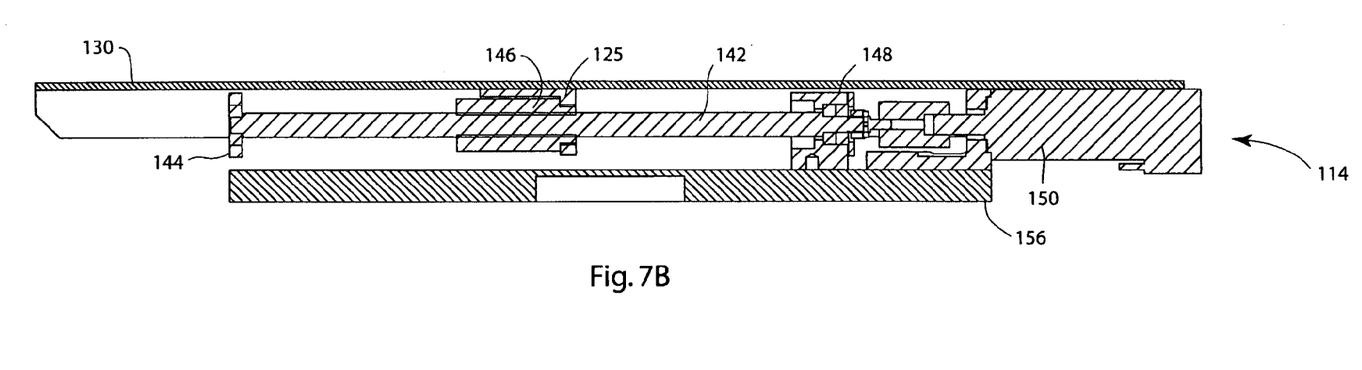
FIG. 7B is a side section of the microscope stage of FIG. 7A taken along line 7B—7B thereof.
Figure 7C:
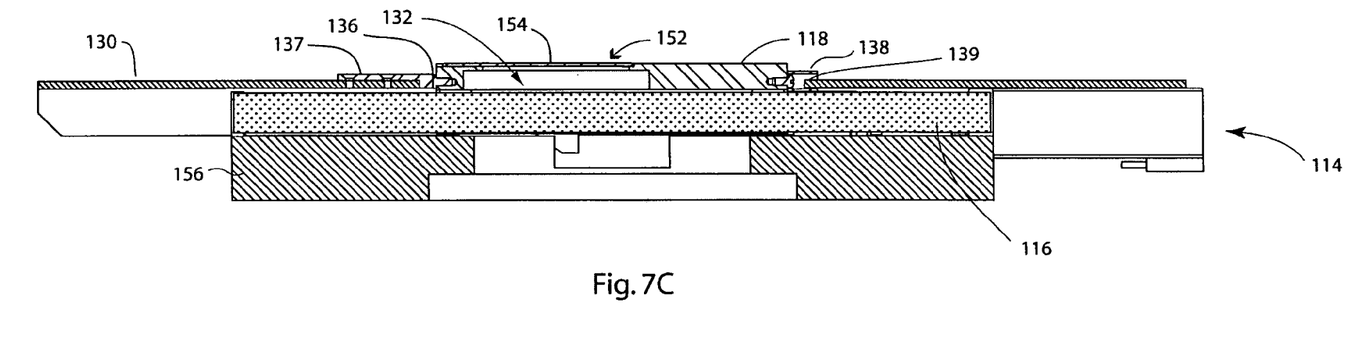
FIG. 7C is a side section of the microscope stage of FIG. 7A, taken along line 7C—7C thereof.
Figure 7D:
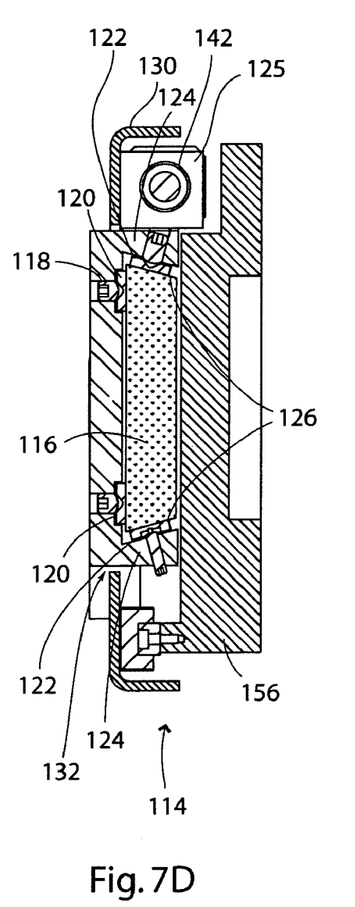
FIG. 7D is an end section of the microscope stage of FIG. 7A, taken along line 7D—7D thereof.
Figure 7E:
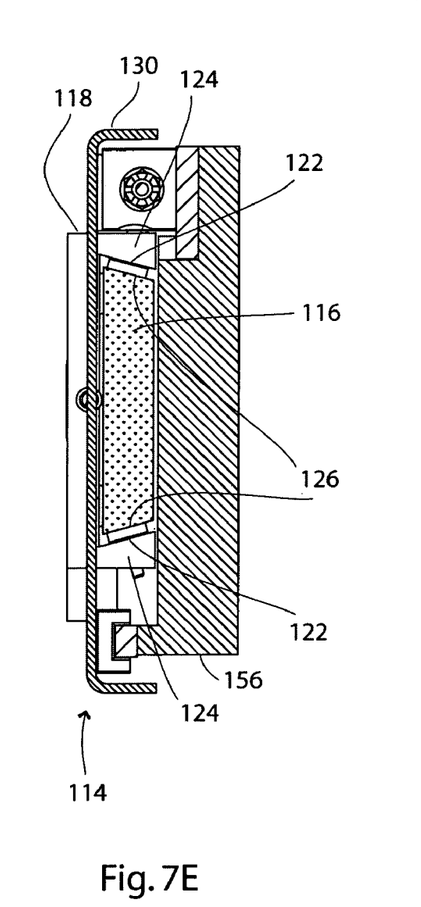
FIG. 7E is an end section of the microscope stage of FIG. 7A, taken along line 7E—7E thereof.

As shown in a third configuration 106 of a microscope stage according to the present invention, the base 108 of a microscope stage according to the present invention may incorporate or support additional optical elements of the illumination system. Thus, for example, an array of lenses 110 may be disposed on the top surface 112 of the base 108 to shorten the focal length of the illumination system and thereby increase its numerical aperture. In this case, a transparent base 108 is used, as explained with respect to the base 60 in configuration 52 of FIG. 3. However, it is to be understood that different types of optical elements, including diffractive elements as well as refractive elements, may be incorporated in or supported by the base 108, depending upon the purpose they are to serve without departing from the principles of the invention.

3. Preferred Embodiment

A preferred embodiment 114 of a microscope stage according to the present invention is shown in FIGS. 7A–7E. This embodiment is based on configuration 52 of FIG. 3. Accordingly, it comprises a glass base 116 having a dovetail cross section, a carriage 118 supported by bearings 120 on the glass base and having side bearings 122 for separating the side elements 124 of the carriage from the side walls 126 of the base. Preferably, bearings 120 and 122 are made of a low-friction material such as Teflon®, but air bearings could also be used as mentioned above. A cover 130 is also provided for engaging and moving the carriage. The cover 130 has an aperture 132 there through for receiving the stage 118. The cover portion is supported at one side by slides 121, which ride on rail 123 and at the other side by a bracket 125 which is supported by an anti-backlash nut 146 that engages a lead screw 142. Thus, both the carriage and the cover have freedom to move longitudinally substantially along parallel but independent axis 134 and 135, respectively, of the microscope stage.

The stage 118 is anti-backlash coupled to the cover 130 by a bearing or contact button 136 on the carriage which is disposed against a pawl 137 on the cover, and by a spring 138 held in place by a tab 139 on the cover so as to push against the carriage. Consequently, while the cover can impart force on the carriage portion to produce longitudinal movement of the stage portion, the carriage is not subjected to moment loading. This permits translational force to be applied to the cover long one side 140 thereof, without imparting significant rotational torque to the carriage, which ensure symmetric alignment with the base. Thus, for example, the lead screw 142 operating against a retainer block 144 and engaging the anti-backlash nut 146 and mounting block 148 can be disposed at side 140 so as to impart longitudinal motion to the cover while keeping to a minimum the eccentricity of loading of the carriage portion due to an induced moment thereon. The lead screw is preferably rotated by a motor 150. However, other mechanisms for imparting force to the cover portion for producing longitudinal motion, such as a linear motor, may be used without departing from the principles of the invention. The glass base 116, rail 123, retainer block 144, mounting block 148 and motor 150 are supported by a support member 156.

As described with respect to FIG. 3, the preferred embodiment described in FIGS. 7A–7E, includes an aperture 152 in the carriage portion for receiving a microscope slide 154 while permitting trans-illumination of the object to be observed by the microscope through the glass base 116.

The terms and expressions which have been employed in the foregoing specification are used therein as terms of description and not of limitation, and there is no intention, in the use of such terms and expressions, to exclude equivalents of the features shown and described or portions thereof, it being recognized that the scope of the invention is defined and limited only by the claims that follow.

What is claimed is:

1. A microscope stage, comprising:
   a carriage for supporting an object to be viewed by a microscope, the carriage having a transparent portion for receiving the object and permitting trans-illumination thereof;
   a transparent base for supporting the carriage and permitting illumination of the specimen there through; and
   bearings for supporting the carriage on the base and permitting relative movement thereof.

2. The microscope stage of claim 1, wherein the transparent base comprises glass.

3. The microscope stage of claim 2, wherein the bearings comprise a low-friction material.

4. The microscope stage of claim 2, wherein the glass is substantially transparent over a predetermined wavelength range.

5. The microscope stage of claim 4, wherein the transparent portion of the carriage comprises an aperture through the carriage.

6. The microscope stage of claim 2, wherein the base includes one or more polished glass surfaces adjacent the bearings.

7. The microscope stage of claim 6, wherein the base has a substantially dovetail cross sectional shape, the widest surface of the base supporting the carriage.

8. The microscope stage of claim 1, wherein the base has a substantially dovetail cross sectional shape, the widest surface of the base supporting the carriage, and the carriage includes a top element adjacent the widest surface of the base and side elements adjacent respective sides of the base, the bearings including one or more bearings between the top element of the carriage and the base, one or more bearings between one of the side elements and the base, and one or more bearings between the other side element and the base.

9. The microscope stage of claim 8, further comprising a cover coupled to the carriage so as to transfer force thereto.

10. The microscope stage of claim 9, wherein the carriage and base define an axis of lateral symmetry in the direction of movement of the carriage, and the mechanism for moving the cover relative to the base comprises a mechanism for applying force to the to the cover relative to the base in the direction of movement of the carriage at a position laterally offset from the axis of lateral symmetry.

11. The microscope stage of claim 10, wherein the cover is coupled to the cover by a rotational coupling disposed substantially at the axis of lateral symmetry.

12. The microscope stage of claim 11, wherein the mechanism for moving the carriage relative to the base comprises a lead screw connected between the base and the cover.

13. The microscope stage of claim 12, wherein the mechanism for moving the cover comprises a motor connected to the lead screw.

14. The microscope stage of claim 1, further comprising a cover coupled to the carriage so as to transfer force thereto.

15. The microscope stage of claim 14, wherein the carriage and base define an axis of lateral symmetry in the direction of movement of the carriage, and the mechanism for moving the cover relative to the base comprises a mechanism for applying force to the to the cover relative to the base in the direction of movement of the carriage at a position laterally offset from the axis of lateral symmetry.

16. The microscope stage of claim 15, wherein the cover is coupled to the cover by a rotational coupling disposed substantially at the axis of lateral symmetry.

17. The microscope stage of claim 15, wherein the mechanism for moving the cover relative to the base comprises a lead screw connected between the base and the cover.

18. The microscope stage of claim 17, wherein the mechanism for moving the cover comprises a motor connected to the lead screw.

19. The microscope stage of claim 1, wherein the bearings comprise air bearings.

20. A microscope stage, comprising:
    a carriage for supporting an object to be viewed by a microscope, the carriage having a transparent portion for receiving the object and permitting trans-illumination thereof;
    a base for supporting the carriage, at least a portion of the base comprising a transparent material to permit illumination of the specimen there through, the transparent material comprising glass; and
    bearings for supporting the carriage on the base and permitting relative movement thereof, the base including one or more polished glass surfaces adjacent the bearings and having a substantially dovetail cross sectional shape, the widest surface of the base supporting the carriage, the carriage including a top element adjacent the widest surface of the base and side elements adjacent respective sides of the base, the bearings including one or more bearings between the top element of the carriage and the base, one or more bearings between one of the side elements and the base, and one or more bearings between the other side element and the base.

21. The microscope stage of claim 20, wherein the glass portion of the base is substantially transparent over a predetermined wavelength range.

22. The microscope stage of claim 20, wherein the transparent portion of the carriage comprises an aperture through the carriage.

23. The microscope stage of claim 20, further comprising a mechanism for moving the carnage relative to the base.

24. The microscope stage of claim 23, wherein the mechanism for moving the carriage comprises a motor.

25. The microscope stage of claim 20, further comprising a cover coupled to the carriage so as to transfer force thereto.

26. The microscope stage of claim 25, wherein the glass portion of the base compnses one or more polished surfaces adjacent respective bearings.

27. The microscope stage of claim 25, wherein the glass portion of the base is substantially transparent over a predetermined wavelength range.

28. The microscope stage of claim 25, further comprising a mechanism for moving the cover relative to the base so as also to move the carriage relative to the base.

29. The microscope stage of claim 25, wherein the carnage and base define an axis of lateral symmetry in the direction of movement of the carriage, and the mechanism for moving the cover relative to the base comprises a mechanism for applying force to the to the cover relative to the base in the direction of movement of the carriage at a position laterally offset from the axis of lateral symmetry.

30. The microscope stage of claim 29, wherein the cover is coupled to the carriage portion by a rotational coupling disposed substantially at the axis of lateral symmetry.

31. The microscope stage of claim 29, wherein the mechanism for moving the cover to the base comprises a lead screw connected between the base and the cover.

32. The microscope stage of claim 31, wherein the mechanism for moving the cover comprises a motor connected to the lead screw.

33. The microscope stage of claim 29, wherein the transparent portion of the carriage compnses an aperture through the carriage.

34. A microscope stage, comprising:
a carriage for supporting an object to be viewed by a microscope;
a cover disposed above the carriage;
a base for supporting the carriage; and
bearings disposed between the base and the carriage for supporting the carriage on the base and permitting relative movement thereof, the carriage being supported on the base by the bearings and the cover being coupled to the carriage so as to transfer force thereto and thereby move the carriage relative to the base.

35. The microscope stage of claim 34, wherein the carriage and base define an axis of lateral symmetry in the direction of movement of the carriage, the stage further comprising a mechanism for moving the carriage relative to the base by applying force to the cover relative to the base in the direction of movement of the carriage at a position laterally offset from the axis of lateral symmetry.

36. The microscope stage of claim 35, wherein the cover is coupled to the carriage by a rotational coupling disposed substantially at the axis of lateral symmetry.

37. The microscope stage of claim 36, wherein the mechanism for moving the carriage relative to the base comprises a lead screw connected between the base and the cover.

38. The microscope stage of claim 37, wherein the mechanism for moving the carriage comprises a motor connected to the lead screw.

39. A microscope stage, comprising:
a carriage for supporting an object to be viewed by a microscope;
a cover;
a base for supporting the carriage, the cover being coupled to the carriage so as to transfer force thereto; and
bearings disposed between the base and the carriage for supporting the carriage on the base and permitting relative movement thereof, wherein the base has a substantially dovetail cross sectional shape, the widest surface of the base supporting the carriage, and the carriage includes a top element adjacent the widest surface of the base and side elements adjacent respective sides of the base, the bearings including one or more bearings between the top element of the carriage and the base, one or more bearings between one of the side elements and the base, and one or more bearings between the other side element and the base.

40. The microscope stage of claim 34, wherein the base includes one or more polished glass surfaces for supporting one or more of the bearings.

41. A method for movably supporting an object to be viewed by a microscope, comprising:
providing a transparent base;
placing on the base a carriage having a transparent portion and providing at least one bearing between the carriage and the base;
placing the object over the transparent portion of the carriage; and
trans-illuminating the object through the base.

42. The method of claim 41, wherein providing a base comprises providing a base made of glass.

43. The method of claim 42, wherein providing a base made of glass comprises providing a base made of glass with one or more polished surfaces adjacent one or more bearings between the base and the carriage.

44. The method of claim 43, wherein placing the object over a transparent portion comprises supporting the object by a transparent slide placed over an aperture in the carriage.

45. A multi-axis imaging system, comprising:
a plurality of optical elements arranged to simultaneously produce respective images of respective regions of an object;
a plurality of image sensing elements corresponding to said respective optical elements and disposed in respective image spaces thereof to capture the respective images of the respective regions of the object;
a carriage for supporting the object, the carriage having a transparent portion for receiving the object and pennitting trans-illumination thereof;
a base for supporting the carriage, at least a portion of the base comprising a transparent material to permit illumination of the specimen there through; and
bearings for supporting the carriage on the base and permitting relative movement thereof.

46. The imaging system of claim 45, wherein the transparent portion of the base comprises glass.

47. The imaging system of claim 46, wherein the glass portion of the base is substantially transparent over a predetermined wavelength range.

48. The imaging system of claim 45, wherein the transparent portion of the carriage compnses an aperture through the carriage.

49. The microscope stage of claim 45, wherein the base includes one or more polished glass surfaces adjacent the bearings.

50. The microscope stage of claim 49, wherein the base has a substantially dovetail cross sectional shape, the widest surface of the base supporting the carriage.

* * * * *